United States Patent
Wu et al.

(10) Patent No.: US 9,979,207 B2
(45) Date of Patent: May 22, 2018

(54) TRANSMISSION DEVICE AND CONTROL METHOD THEREOF

(71) Applicant: Nuvoton Technology Corporation, Hsinchu (TW)

(72) Inventors: Chun-Yi Wu, New Taipei (TW); Ping-Ying Chu, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 616 days.

(21) Appl. No.: 14/590,576

(22) Filed: Jan. 6, 2015

(65) Prior Publication Data

US 2016/0049802 A1 Feb. 18, 2016

(30) Foreign Application Priority Data

Aug. 14, 2014 (TW) .............................. 103127881 A (51) Int. Cl.
*H02J 7/00* (2006.01)

(52) U.S. Cl.
CPC ..... *H02J 7/0004* (2013.01); *H02J 2007/0062* (2013.01)

(58) Field of Classification Search
None
See application file for complete search history.

(56) References Cited

U.S. PATENT DOCUMENTS

| 7,917,781 B2* | 3/2011 | Ho | H02J 1/00 710/305 |
| 8,237,414 B1* | 8/2012 | Li | H02J 7/0003 320/103 |
| 2012/0166173 A1* | 6/2012 | Fischbach | G06F 1/266 703/28 |
| 2012/0200173 A1* | 8/2012 | Liu | G06F 1/1613 307/116 |

(Continued)

FOREIGN PATENT DOCUMENTS

| TW | 201235857 A | 9/2012 |
| TW | M453285 | 5/2013 |
| TW | M477057 | 4/2014 |

OTHER PUBLICATIONS

Taiwanese Office Action with Search Report issued from coresponding Taiwanese Application, dated Oct. 8, 2015, 6 pages.

*Primary Examiner* — Jared Fureman
*Assistant Examiner* — Joel Barnett
(74) *Attorney, Agent, or Firm* — Muncy, Geissler, Olds & Lowe, P.C.

(57) ABSTRACT

A chip is provided. A power transmission path and a data transmission path are coupled between an upstream port and a downstream port. A first detection unit generates a first trigger signal when a voltage level of the power transmission path reaches a first predetermined value. A first control unit turns on the data transmission path according to the first trigger signal. A second detection unit detects a voltage level of the data transmission path. When the voltage level of the (Continued)

data transmission path matches a pre-determined condition, the second detection unit generates a second trigger signal, and the first control unit turns off the data transmission path according to the second trigger signal. A setting unit sets the voltage level of the data transmission path when the first control unit turns off the data transmission path.

10 Claims, 6 Drawing Sheets

(56) References Cited

U.S. PATENT DOCUMENTS

| | | | |
|---|---|---|---|
| 2014/0015343 A1* | 1/2014 | Lin | H01R 13/6658 307/130 |
| 2015/0155729 A1* | 6/2015 | Lee | H01R 13/70 320/114 |

* cited by examiner

TRANSMISSION DEVICE AND CONTROL METHOD THEREOF

CROSS REFERENCE TO RELATED APPLICATIONS

This application claims priority of Taiwan Patent Application No. 103127881, filed on Aug. 14, 2014, the entirety of which is incorporated by reference herein.

BACKGROUND OF THE INVENTION

Field of the Invention

The embodiments of invention relates to a transmission device, and more particularly to a transmission device coupled between a charging device and an electronic device.

Description of the Related Art

With the development of technology, the functions and types of electronic devices have increased. Generally, a mobile electronic device receives power provided by a host device via a cable, such as a USB cable, or it receives main power via an adapter. However, different adapters provide different charging currents to different electronic devices. Therefore, when an electronic device is not coupled to the corresponding adapter, the electronic device cannot receive a large current.

BRIEF SUMMARY OF THE INVENTION

In accordance with an embodiment, a chip including a power transmission path, a data transmission path, a first detection unit, a first control unit, a second detection unit, and a setting unit is provided. The power transmission path is coupled between an upstream port and a downstream port. The data transmission path is coupled between the upstream port and the downstream port. The first detection unit generates a first trigger signal when a voltage level of the power transmission path reaches a first predetermined value. The first control unit turns on the data transmission path according to the first trigger signal. The second detection unit detects a voltage level of the data transmission path. When the voltage level of the data transmission path matches a predetermined condition, the second detection unit generates a second trigger signal, and the first control unit turns off the data transmission path according to the second trigger signal. The setting unit sets the voltage level of the data transmission path when the first control unit turns off the data transmission path.

In accordance with another embodiment, a transmission device including an upstream port, a downstream port, and a chip is provided. The upstream port is configured to couple to a charging device. The downstream port is configured to be coupled to an electronic device. The chip includes a power transmission path, a data transmission path, a first detection unit, a first control unit, a second detection unit, and a setting unit. The power transmission path is coupled between the upstream port and the downstream port. The data transmission path is coupled between the upstream port and the downstream port. The first detection unit generates a first trigger signal when a voltage level of the data transmission path reaches a first predetermined value. The first control unit turns on the data transmission path according to the first trigger signal. The second detection unit detects the voltage level of the data transmission path. When the voltage level of the data transmission path matches a predetermined condition, the second detection unit generates a second trigger signal, and the first control unit turns off the data transmission path according to the second trigger signal. The setting unit sets the voltage level of the data transmission path when the first control unit turns off the data transmission path.

An exemplary embodiment of a control method is described in the following. A power transmission path is provided between a charging device and an electronic device. A data transmission path is provided between the charging device and the electronic device. A voltage level of the power transmission path is detected. When the voltage level of the power transmission path reaches a first predetermined value, the data transmission path is turned on. A voltage level of the data transmission path is detected. When the voltage level of the data transmission path matches a predetermined condition, the data transmission path is turned off and the voltage level of the data transmission path is set.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings as follows.

DETAILED DESCRIPTION OF THE INVENTION

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

Figure 1:
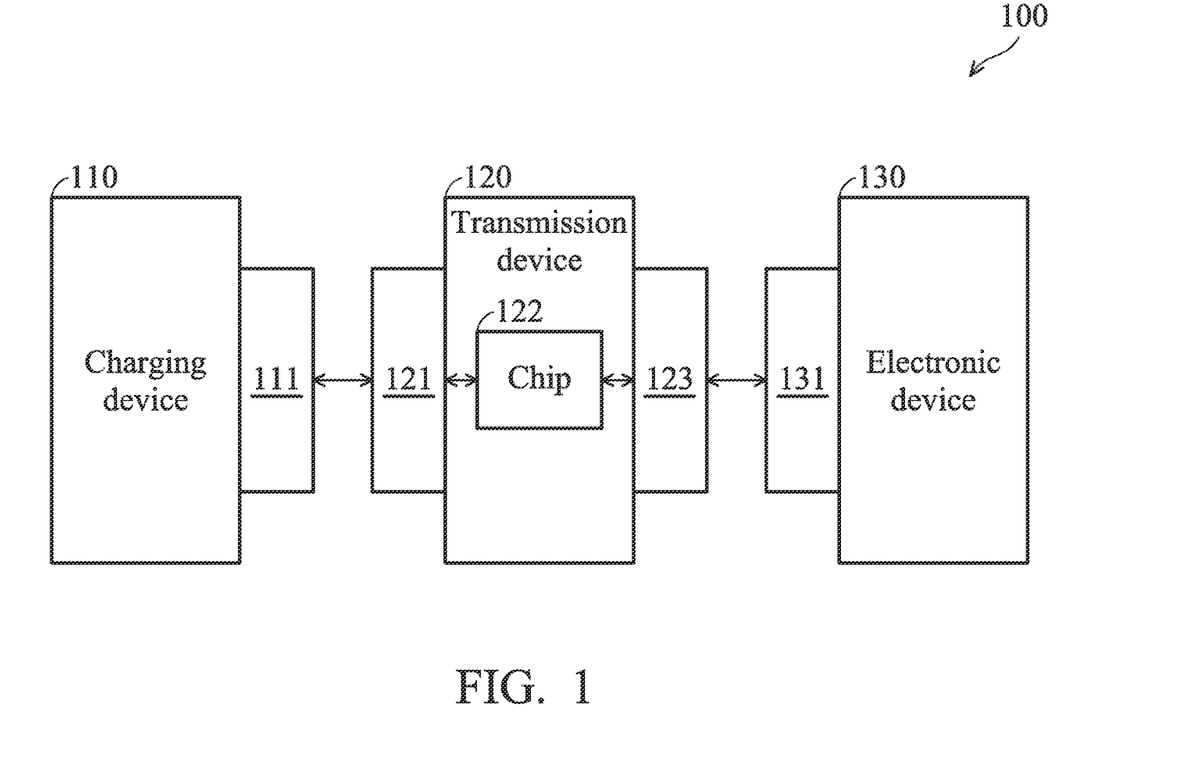
FIG. 1 is a schematic diagram of an exemplary embodiment of a transmission system.

FIG. 1 is a schematic diagram of an exemplary embodiment of a transmission system. The transmission system 100 comprises a charging device 110, a transmission device 120 and an electronic device 130. The invention does not limit the kind of charging device 110. Any device can serve as the charging device 110, as long as the device is capable of providing power. In one embodiment, the charging device 110 is an adapter or a host device. The invention does not limit the kind of electronic device 130. In one embodiment, the electronic device 130 is a mobile device.

The transmission device 120 includes an upstream port 121, a chip 122 and a downstream port 123. The upstream port 121 is configured to couple to the connection port 111 of the charging device 110. The downstream port 123 is configured to couple to the connection port 131 of the electronic device 130. The chip 122 can transmit power and data between the charging device 110 and the electronic device 130. The invention does not limit the kinds of upstream port 121 and downstream port 123. In one embodiment, the upstream port 121 and the downstream port 123 are USB connection ports. In some embodiments, the transmission device 120 is a cable or a connection board.

The chip 122 sets the charge mode of the electronic device 130 according to the kind of charging device 110. In one embodiment, when the charging device 110 is not an adapter, the chip 122 directs the electronic device 130 to enter a first charging mode. In this mode, the electronic device 130 captures a first current, such as 500 mA, from the charging device 110. When the charging device 110 is an adapter, the chip 122 directs the electronic device 130 to enter a second charging mode. In this mode, the electronic device 130 captures a second current, such as 1.5 A~2 A, from the charging device 110.

In other embodiments, the transmission device 120 includes a display unit (not shown) to represent the charging mode of the electronic device 130. The invention does not limit the kind of display unit. In one embodiment, the display unit is a display panel. The display panel displays an image to indicate the charging mode of the electronic device 130. For example, the electronic device 130 may operate in a fast charging mode, a normal charging mode or a non-charging mode. In the fast charging mode, the charging current is higher than 500 mA. In the normal charging mode, the charging current is within 50 mA~500 mA. In the non-charging mode, the charging current is less than 50 mA. In another embodiment, the display unit is a Light-Emitting Diode (LED). When the electronic device 130 operates in different charging modes, the LED emits different color lights. In other embodiments, the display unit is constituted by various LEDs. When the electronic device 130 operates in different charging modes, different numbers of LEDs are lighted.

Figure 2:
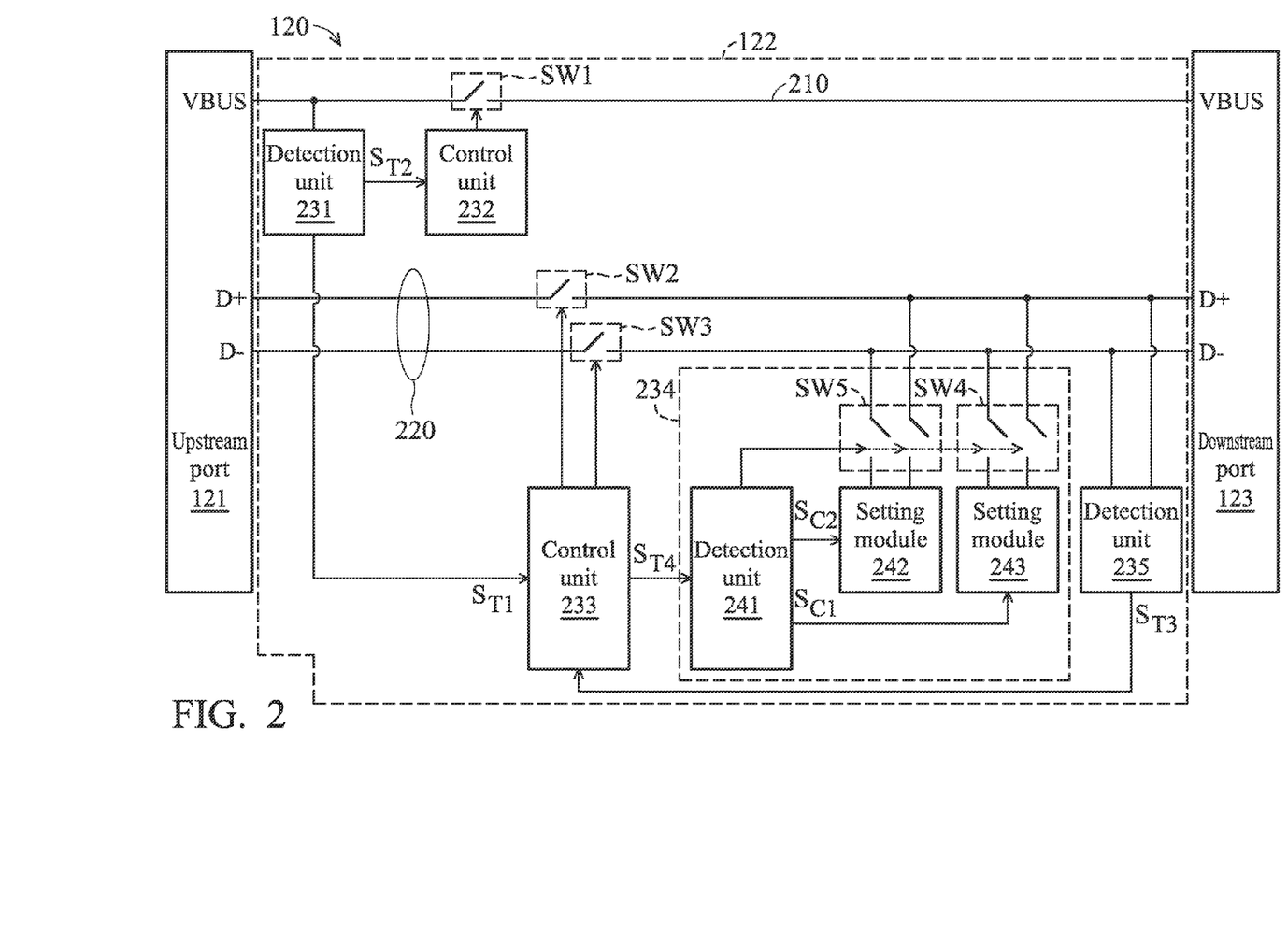
FIG. 2 is a schematic diagram of an exemplary embodiment of a chip of the invention.

FIG. 2 is a schematic diagram of an exemplary embodiment of a chip of the invention. The chip 122 includes a power transmission path 210, a data transmission path 220, detection units 231 and 235, control units 232 and 233, and a setting unit 234. In one embodiment, the voltage levels of the power transmission path 210 and data transmission path 220 conform to USB protocol.

As shown in FIG. 2, the power transmission path 210 and the data transmission path 220 are coupled between the upstream port 121 and the downstream port 123. In this embodiment, the power transmission path 210 is coupled between the power pins VBUS of the upstream port 121 and the downstream port 123, and the data transmission path 220 is coupled between the data pins D+ of the upstream port 121 and the downstream port 123 and coupled between the data pins D− of the upstream port 121 and the downstream port 123.

The detection unit 231 detects the voltage level of the power transmission path 210. When the voltage level of the power transmission path 210 reaches a first predetermined value, the detection unit 231 generates a trigger signal $S_{T1}$. The invention does not limit the circuit structure of the detection unit 231. In this embodiment, the detection unit 231 is a voltage detector.

Furthermore, when the voltage level of the power transmission path 210 reaches the first predetermined value, the detection unit 231 further generates another trigger signal $S_{T2}$. The control unit 232 controls the switch SW1 according to the trigger signal $S_{T2}$ to turn on or off the power transmission path 210. For example, when the control unit 232 turns on the switch SW1, the power transmission path 210 is turned on. When the control unit 232 turns off the switch SW1, the power transmission path 210 is turned off.

The control unit 233 turns on the data transmission path 220 according to the trigger signal $S_{T1}$. As shown in FIG. 2, the switch SW2 is coupled between the data pins D+ of the upstream port 121 and the downstream port 123, and the switch SW3 is coupled between the data pins D− of the upstream port 121 and the downstream port 123. The control unit 233 controls the switches SW2 and SW3 to turn on or off the data transmission path 220.

The detection unit 235 detects the voltage level of the data transmission path 220. In one embodiment, the detection unit 235 is a voltage detector. When the voltage level of the data transmission path 220 matches a predetermined condition, the detection unit 235 generates a trigger signal $S_{T3}$. The control unit 233 turns off the data transmission path 220 according to the trigger signal $S_{T3}$. In one embodiment, the predetermined condition is that the voltage level of the data pin D+ is within 2.7V~3.3V and the voltage level of the data pin D− is 0V.

In this embodiment, when the voltage level of the data transmission path 220 does not match the predetermined condition, this means that the device connecting to the upstream port 121 is not an adapter. Therefore, the control unit 233 turns on the data transmission path 220 because the upstream port 121 may couple to a host device. However, when the voltage level of the data transmission path 220 matches the predetermined condition, it means that the upstream port 121 is coupled to an adapter. Therefore, the control unit 233 turns off the data transmission path 220 because the adapter cannot provide data to the upstream port 121. At this time, the control unit 233 generates a trigger signal $S_{T4}$.

The setting unit 234 sets the voltage level of the data transmission path 220 according to the trigger signal $S_{T4}$ and adjusts the voltage level of the data transmission path 220 according to the change of the voltage level of the data transmission path 220. In this embodiment, when the setting unit 234 receives the trigger signal $S_{T4}$, the setting unit 234 provides a second predetermined value to the data transmission path 220 and detects whether the voltage level of the data transmission path 220 is changed.

When the voltage level of the data transmission path 220 is maintained at the second predetermined value, it means that the electronic device 130 connected to the downstream port 123 belongs to a first category of products, such as products manufactured by Apple Corporation. In this case, since the voltage level of the data transmission path 220 is equal to the second predetermined value, the electronic device 130 captures a large current from the power transmission path 210. At this time, the setting unit 234 continuously provides the second predetermined value to the data transmission path 220.

When the voltage level of the data transmission path 220 is not equal to the second predetermined value, it means that the electronic device 130 connected to the downstream port 123 does not belong to the first category of the products. Therefore, the setting unit 234 provides a third predetermined value to the data transmission path 220. In an embodiment, when the voltage level of the data transmission path 220 is not equal to the second predetermined value, it means that the electronic device 130 belongs to a second category of products, such as products manufactured by Samsung Corporation.

Since the data transmission path 220 is equal to the third predetermined value, the electronic device 130 obtains that the charging device 110 connected to the upstream port 121 is an adapter. Therefore, the electronic device 110 enters a fast charging mode to capture larger current. Additionally, before the setting unit 234 provides the third predetermined value to the data transmission path 220, the control unit 232 turns off the power transmission path 210. After the setting unit 234 provides the third predetermined value to the data transmission path 220, the control unit 232 turns on the power transmission path 210. In one embodiment, the third predetermined value is less than the second predetermined value.

In this embodiment, after providing the third predetermined value to the data transmission path 220, the setting unit 234 waits for a predetermined time, such as 2 sec, and then transforms the state of the data transmission path 220 into a short floating state. When the state of the data transmission path 220 is transformed into the short floating state, the pins D+ and D− are short and floating. At this time, the electronic device 130 enters a fast charging mode if the electronic device 130 belongs to a third category of products, such as products manufactured by other Corporations that are not Apple Corporation and Samsung Corporation. In the fast charging mode, the electronic device 130 captures a large current from the power transmission path 210.

In this embodiment, the setting unit 234 includes a detection unit 241, and setting modules 242 and 243. When the control unit 233 generates the trigger signal $S_{T4}$, the detection unit 241 generates a control signal $S_{C1}$. The setting module 243 outputs the second predetermined value according to the control signal $S_{C1}$. In this embodiment, the detection unit 241 turns on the switch SW4 such that the voltage level of the data transmission path 220 is equal to the second predetermined value.

The detection unit 241 detects the voltage level of the data transmission path 220. When the voltage level of the data transmission path 220 is not equal to the second predetermined value, the detection unit 241 adjusts the control signal $S_{C1}$ to activate the setting module 243 to output a third predetermined value. In this embodiment, the detection unit 241 continuously turns on the switch SW4 to provide the third predetermined value to the data transmission path 220. Waiting for a predetermined time, the detection unit 241 turns off the switch SW4 and turns on the switch SW5. At this time, the detection unit 241 generates a control signal $S_{C2}$. The setting module 242 sets the voltage level of the data transmission path 220 according to the control signal $S_{C2}$. In this embodiment, the setting module 242 sets the state of the data transmission path 220 to a short floating state. In one embodiment, the setting module 242 conforms to the specifications of a Dedicated Charging Port (DCP).

Figure 3:
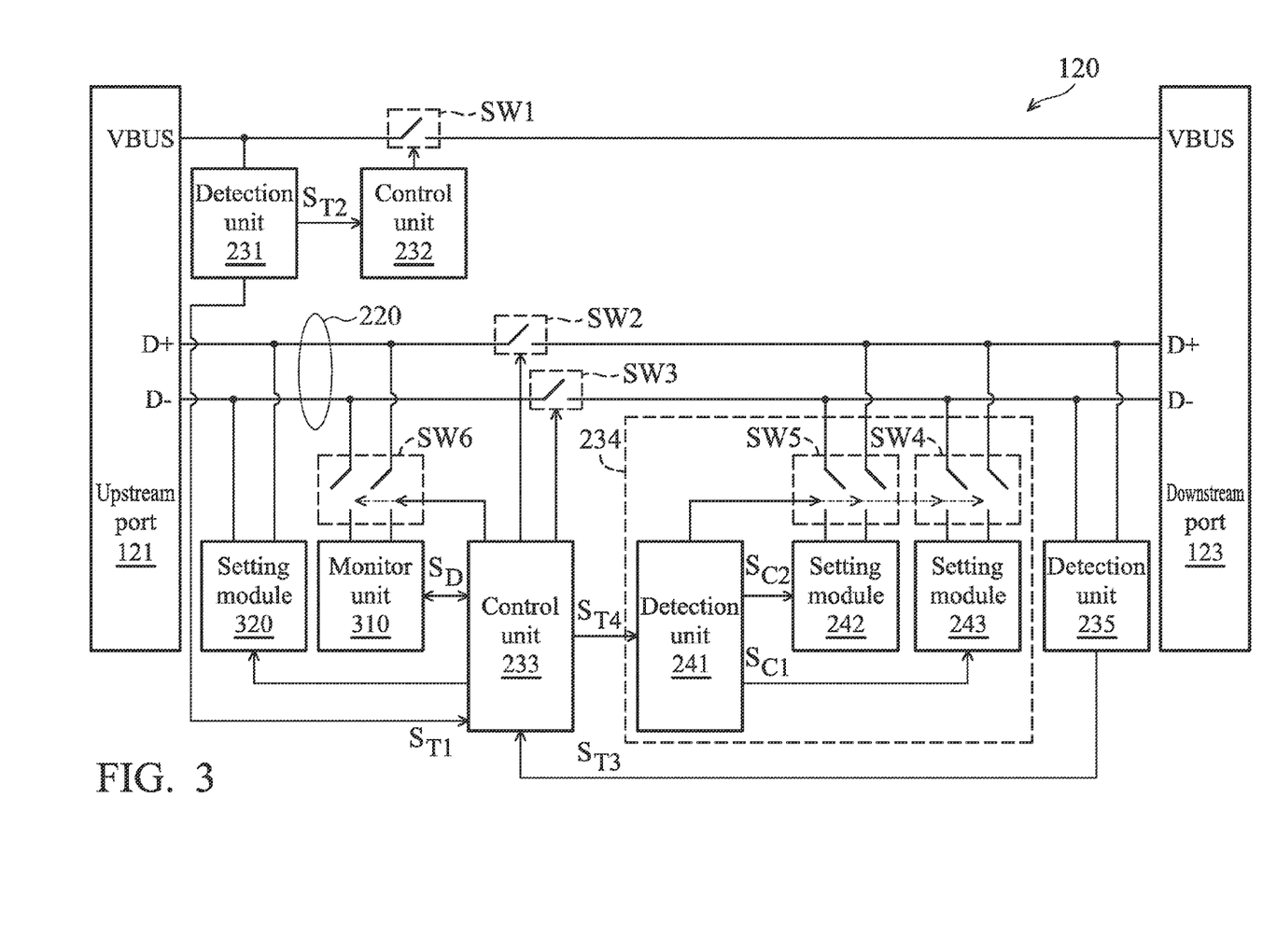
FIGS. 3 and 4 are schematic diagrams of exemplary embodiments of a transmission device, in accordance with some embodiments.

FIG. 3 is a schematic diagram of another exemplary embodiment of a transmission device. FIG. 3 is similar to FIG. 2 except for the additions of a monitor unit 310, a setting module 320 and a switch SW6. In this embodiment, when turning off the data transmission path 220, the control unit 233 activates the monitor unit 310 and turns on the switch SW6. When the monitor unit 310 is activated, the monitor unit 310 provides a fourth predetermined value to the data transmission path 220 and determines whether the voltage level of the data transmission path 220 is changed.

When the voltage level of the data transmission path 220 is not equal to the fourth predetermined value, it means that the charging device 110 connected to the upstream port 121 is a host device and the host device is woken up from a sleep mode. Since the charging device 110 exits the sleep mode, the charging device 110 may provide data to the electronic device 130. Therefore, the monitor unit 310 generates a disable signal $S_D$. The control unit 233 turns on the data transmission path 220 according to the disable signal $S_D$ and stops generating the trigger signal $S_{T4}$ to disable the setting unit 234.

In one embodiment, the setting unit 320 conforms to the specifications of a Charging Downstream Port (CDP). In another embodiment, when the monitor unit 310 is activated, the monitor unit 310 sets the voltage level of the data pin D+ to 3.3V and sets the voltage level of the data pin D− to 0V.

Figure 4:
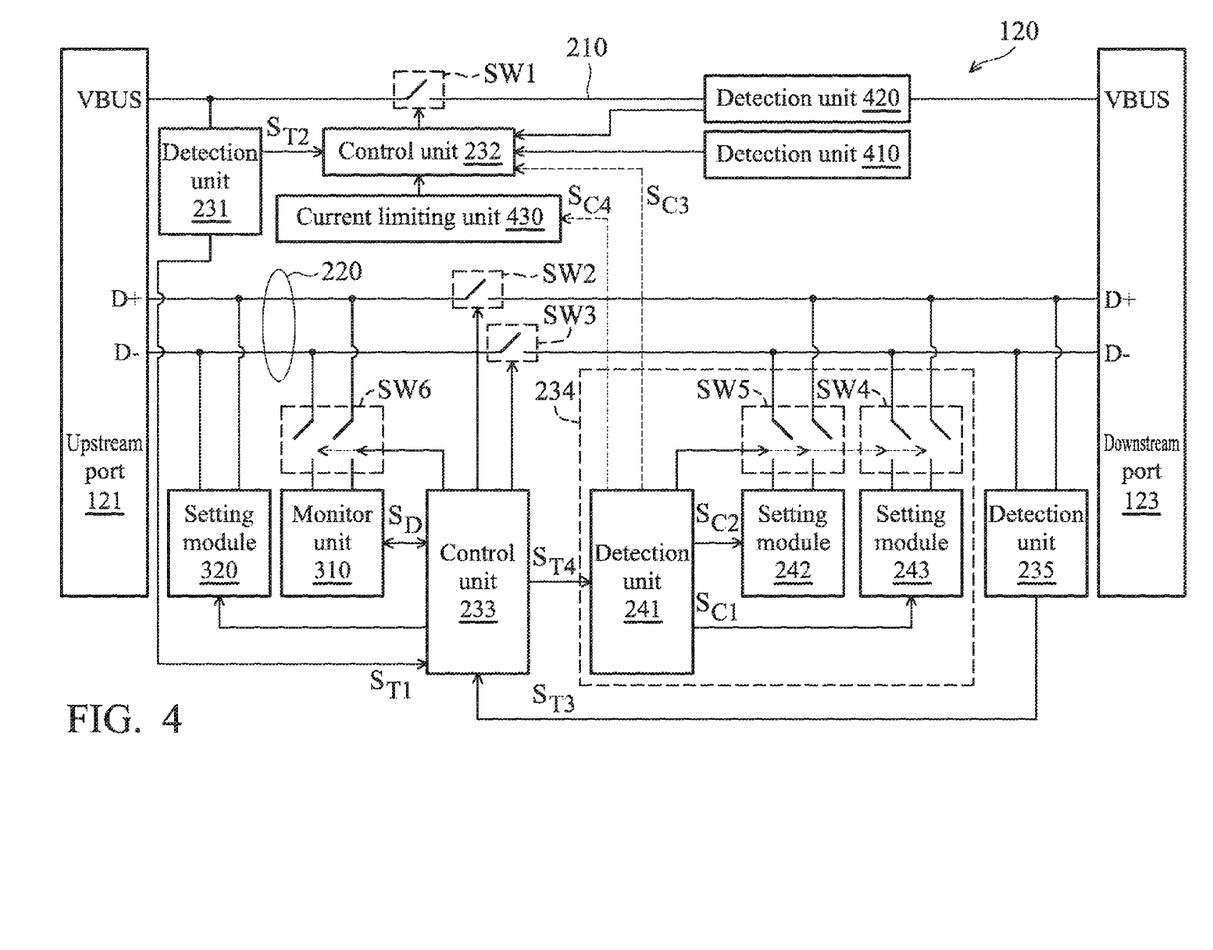

FIG. 4 is a schematic diagram of another exemplary embodiment of a transmission device in accordance with an embodiment. FIG. 4 is similar to FIG. 3 except for the additions of detection units 410 and 420, and a current limiting unit 430. The detection unit 410 detects the temperature of the transmission device 120. When the temperature of the transmission device 120 is greater than a predetermined value, the detection unit 410 notifies the control unit 232 to turn off the power transmission path 210. The detection unit 420 detects the current flowing through the power transmission path 210. When the current flowing through the power transmission path 210 is greater than a predetermined value, the detection unit 420 notifies the control unit 232 to turn off the power transmission path 210.

In this embodiment, when the voltage level of the data transmission path 220 is not equal to the second predetermined value, the setting unit 234 generates a control signal $S_{C3}$ to the control unit 232. The control unit 232 turns off the power transmission path 210 according to the control signal $S_{C3}$. After providing the third predetermined value to the data transmission path 220, the setting unit 234 turns on the power transmission path 210 via the control signal $S_{C3}$.

Additionally, the setting unit 234 generates a control signal $S_{C4}$ to the current limiting unit 430 according to the voltage level of the data transmission path 220. The current limiting unit 430 controls the control unit 232 according to the control signal $S_{C4}$ to adjust the current flowing through the power transmission path 210. In this embodiment, when the upstream port 121 is coupled to an adapter, the electronic device 130 captures a large current from the adapter.

Figure 5:
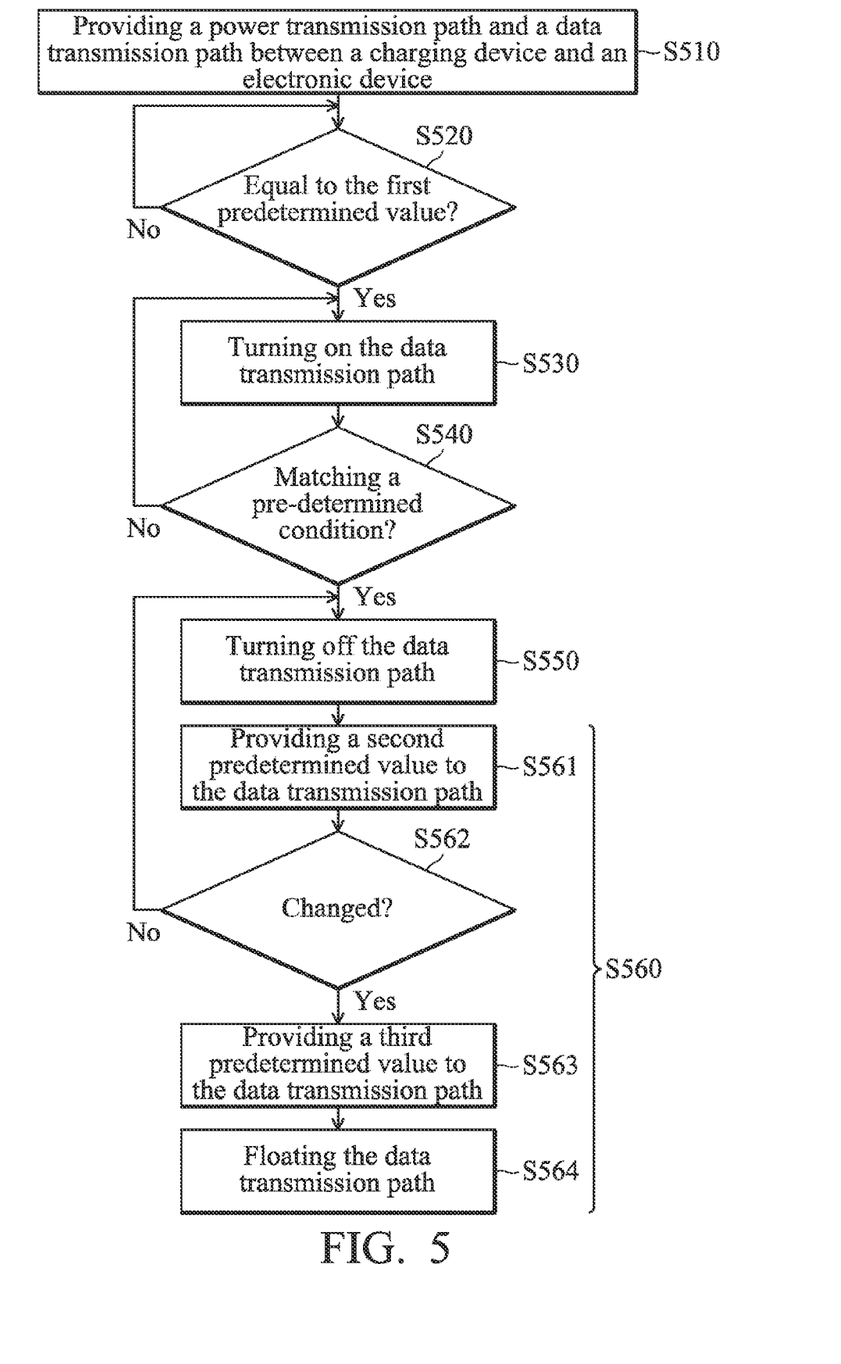
FIGS. 5 and 6 are schematic diagrams of exemplary embodiments of a control method, in accordance with some embodiments.

FIG. 5 is a schematic diagram of an exemplary embodiment of a control method in accordance with an embodiment. First, a power transmission path is provided between a charging device and an electronic device and a data transmission path is provided between the charging device and the electronic device (step S510). In one embodiment, the power and data transmission paths conform to a USB protocol.

The voltage level of the power transmission path is detected (step S520). When the voltage level of the power transmission path is not equal to a first predetermined value, step S520 is executed again to continuously detect the voltage level of the power transmission path. When the voltage level of the power transmission path is equal to the first predetermined value, the data transmission path is turned on (step S530).

The voltage level of the data transmission path is detected to detect the kind of charging device (step S540). In one embodiment, when the charging device is a host device, the voltage level of the data transmission path does not match a predetermined condition and step S530 is executed to continuously turn on the data transmission path between the host device and the electronic device, so as the host device can provide data to the electronic device if necessary. Conversely, when the voltage level of the data transmission path matches the predetermined condition, it means that the charging device is an adapter. Therefore, step S550 is executed to turn off the data transmission path because the adapter does not provide data to the electronic device.

Then, step S560 is executed to set the voltage level of the data transmission path. In this embodiment, by setting the voltage level of the data transmission path, the electronic device automatically operates in the fast charging mode. In the fast charging mode, the electronic device captures a large current from the adapter.

A second predetermined value is provided to the data transmission path (step S561). Then, it is determined whether the voltage level of the data transmission path is changed (step S562). If the voltage level of the data transmission path is maintained at the second predetermined value, it means that the electronic device belongs to a first category of products, such as products manufactured by Apple Corporation. Therefore, step S550 is executed to turn off the data transmission path. At this time, since the voltage level of the data transmission path is equal to the second predetermined value, the electronic device captures a large current from an adapter and enters a fast charging mode.

When the voltage level of the data transmission path is changed to be unequal to the second predetermined value, it means that the electronic device does not belong to the first category of products. In one embodiment, the electronic device may belong to a second category of the products. Therefore, a third predetermined value is provided to the data transmission path (step S563). In one embodiment, the third predetermined value is less than the second predetermined value. In step S563, when the electronic device belongs to a second category of the products, such as the products manufactured by Samsung Corporation, since the level of the data transmission path is equal to the third predetermined value, the electronic device captures a large current from an adapter.

Then, after a predetermined time, the state of the data transmission path is transformed into a short floating state (step S564). In one embodiment, the data transmission path is turned off after step S564. In this embodiment, if the electronic device belongs to a third category of the products, such as products manufactured by Corporations other than Apple and Samsung, since the state of the data transmission path is the short floating state, the electronic device automatically operates in a fast charging mode and captures a large current from an adapter.

Figure 6:
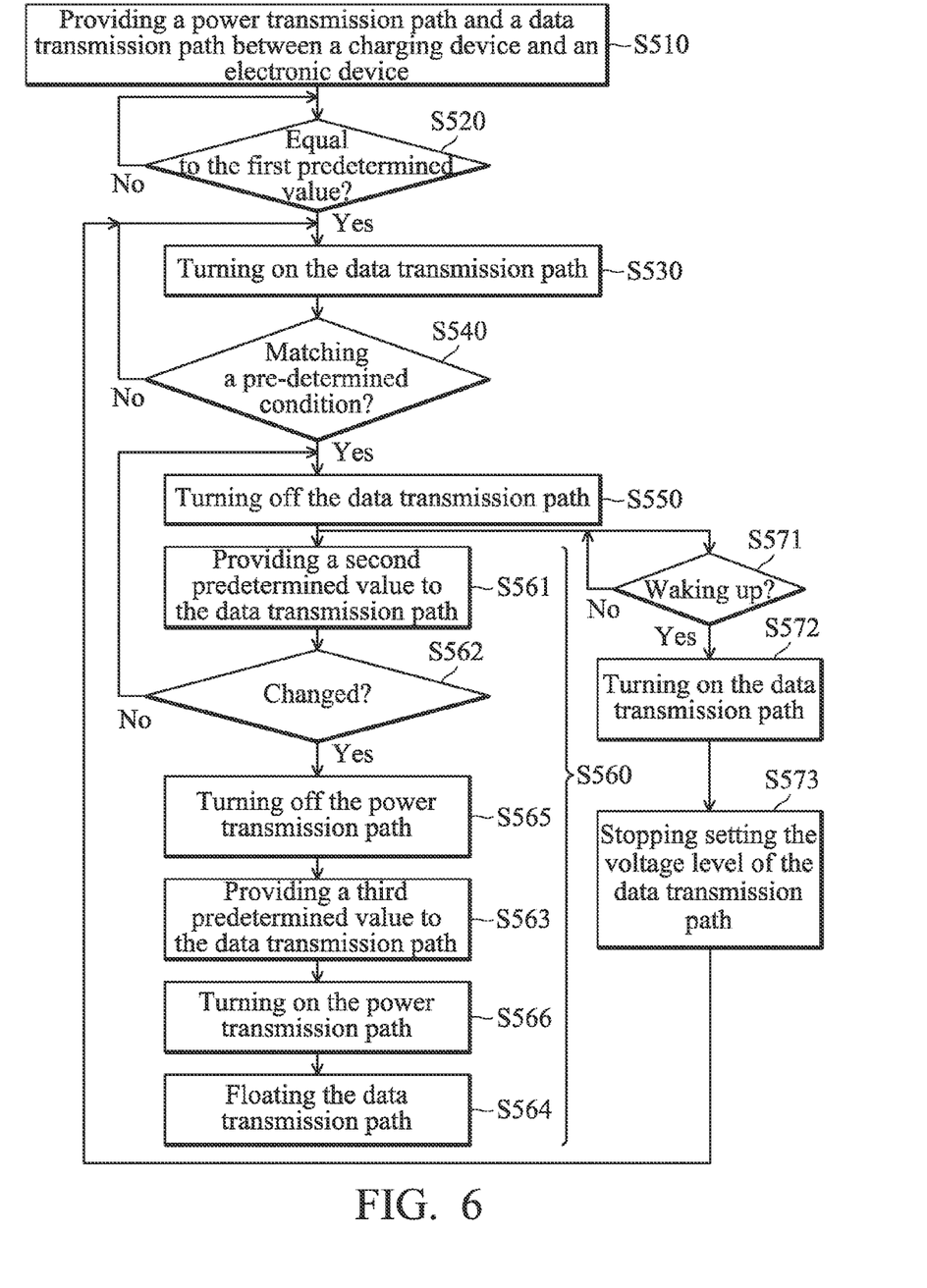

FIG. 6 is a schematic diagram of another exemplary embodiment of a control method of steps S565~S566 and S571~S573. In this embodiment, step S560 is executed and simultaneously, step S571 is executed to determine whether the charging device is awaked. When the charging device is awaked, the execution of step S560 is stopped and steps S572 and S573 are executed to ensure that the electronic device is capable of receiving normal data immediately.

The invention does not limit how step S571 determines whether the charging device is woken up. In one embodiment, step S571 provides a determining voltage level to the data transmission path and determines whether the voltage level of the data transmission path has changed. When the voltage level of the data transmission path has changed, it means that the charging device is a host device and is woken up from a sleep mode. Therefore, steps S572 and S573 are executed. Step S572 turns on the data transmission path to transmit data. Step S573 stops setting the voltage level of the data transmission path such that the electronic device receives the data provided from the host device and then step S530 is executed.

In this embodiment, when the voltage level of the data transmission path cannot be maintained at the second predetermined value, the power transmission path is turned off (step S565). Next, step S563 is executed to turn on the power transmission path (step S566) such that the electronic device executes a charging operation according to the charging current flowing through the power transmission path.

Since the electronic device is capable of automatically entering a fast charging mode according to the voltage level of the data transmission path, the charging time of the electronic device can be reduced. Furthermore, when the charging device is woken up, the transmission device immediately turns on the data transmission path such that the electronic device is capable of receiving data.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A chip, comprising:
    a power transmission path coupled between an upstream port and a downstream port;
    a data transmission path comprising a first end and a second end, wherein the first end is coupled to the upstream port and the second end is coupled to the downstream port, wherein switches are disposed between the first and second ends;
    a first detection unit generating a first trigger signal when a voltage level of the power transmission path reaches a first predetermined value;
    a first control unit turning on the switches according to the first trigger signal;
    a second detection unit detecting a voltage level of the second end, wherein when the voltage level of the second end matches a predetermined condition, the second detection unit generates a second trigger signal, and the first control unit turns off the switches according to the second trigger signal; and
    a setting unit setting the voltage level of the second end when the first control unit turns off the switches.

2. The chip as claimed in claim 1, wherein when the first control unit turns off the switches, the setting unit provides a second predetermined value to the second end and detects the voltage level of the second end, and when the voltage level of the second end is not equal to the second predetermined value, the setting unit provides a third predetermined value to the second end.

3. The chip as claimed in claim 2, wherein the third predetermined value is less than the second predetermined value.

4. The chip as claimed in claim 2, wherein after providing the third predetermined value to the second end, the setting unit waits for a predetermined time and then transforms a state of the second end into a short-floating state.

5. The chip as claimed in claim 2, further comprising:
    a second control unit turning off the power transmission path when the voltage level of the second end is not equal to the second predetermined value until the setting unit provides the third predetermined value to the second end, wherein after the setting unit provides the third predetermined value to the second end, the second control unit turns on the power transmission path.

6. The chip as claimed in claim 1, further comprising:
a monitor unit providing a fourth predetermined value to the first end and monitoring the voltage level of the first end when the first control unit turns off the switches, wherein when the voltage level of the first end is not equal to the fourth predetermined value, the monitor unit generates a disable signal, and the first control unit turns on the switches according to the disable signal and controls the setting unit to stop setting the voltage level of the second end.

7. The chip as claimed in claim 1, wherein the first and second detection units are voltage detectors.

8. A transmission device comprising:
an upstream port configured to couple to a charging device;
a downstream port configured to couple to an electronic device; and
a chip comprising:
a power transmission path coupled between the upstream port and the downstream port;
a data transmission path comprising a first end and a second end, wherein the first end is coupled to the upstream port and the second end is coupled to the downstream port, wherein switches are disposed between the first and second ends;
a first detection unit generating a first trigger signal when a voltage level of the second end reaches a first predetermined value;
a first control unit turning on the switches according to the first trigger signal;
a second detection unit detecting the voltage level of the second end, wherein when the voltage level of the second end matches a predetermined condition, the second detection unit generates a second trigger signal, and the first control unit turns off the switches according to the second trigger signal; and
a setting unit setting the voltage level of the second end when the first control unit turns off the switches.

9. The transmission device as claimed in claim 8, wherein the upstream port is a first USB connection port and the downstream port is a second USB connection port.

10. The transmission device as claimed in claim 9, wherein the first USB connection port comprises a first data pin and a second data pin, the first end is coupled to the first and second data pins, and when a voltage level difference between the first and second data pins is within 2.7V~3.3V, it means that the voltage level of the second end matches the predetermined condition.

* * * * *